No. 616,702. Patented Dec. 27, 1898.
G. B. FRITZIUS & W. N. MARKS.
DEVICE FOR ASSISTING VEHICLE WHEELS OFF CAR TRACKS.
(Application filed Feb. 12, 1898.)
(No Model.)
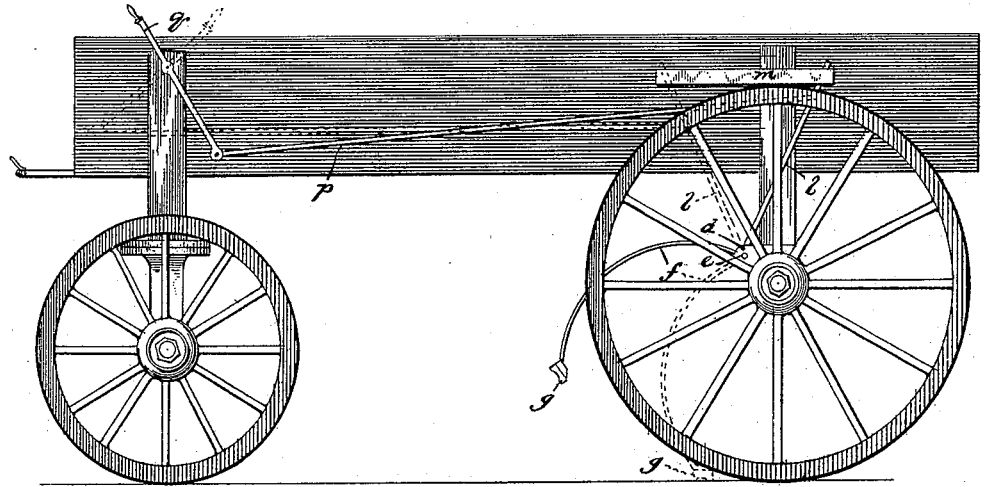
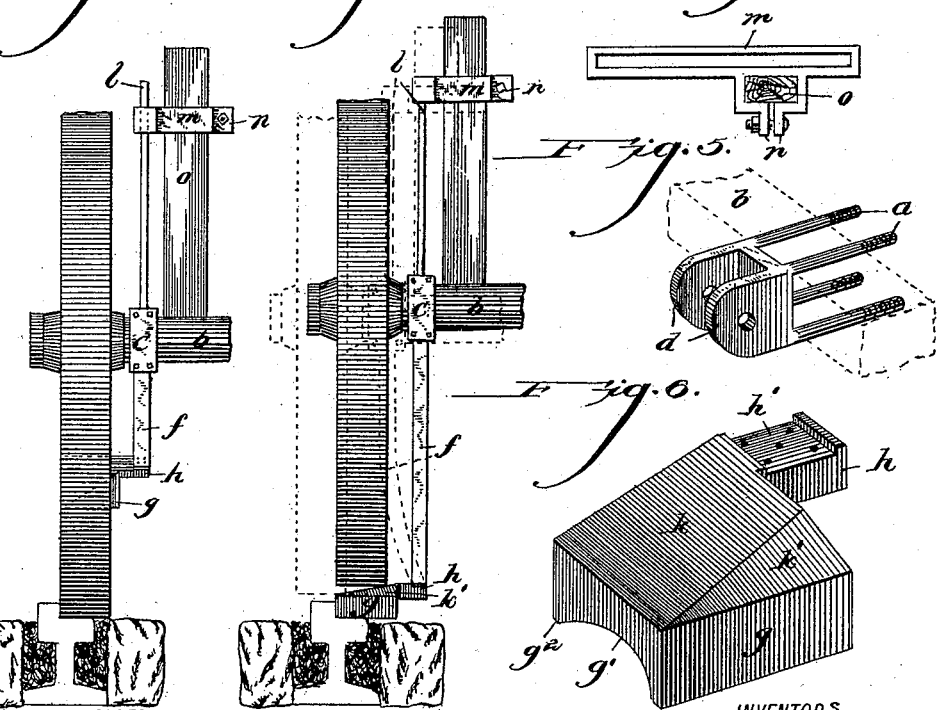
WITNESSES:
INVENTORS
G. B. Fritzius.
W. N. Marks.
BY
Henry E. Evert & Co
ATTORNEYS

UNITED STATES PATENT OFFICE.

GEORGE B. FRITZIUS AND WESLY N. MARKS, OF BRADDOCK, PENNSYLVANIA.

DEVICE FOR ASSISTING VEHICLE-WHEELS OFF CAR-TRACKS.

SPECIFICATION forming part of Letters Patent No. 616,702, dated December 27, 1898.

Application filed February 12, 1898. Serial No. 670,075. (No model.)

*To all whom it may concern:*

Be it known that we, GEORGE B. FRITZIUS and WESLY N. MARKS, citizens of the United States of America, residing at Braddock, in the county of Allegheny and State of Pennsylvania, have invented certain new and useful Improvements in Devices to Assist the Rear Wheels of Vehicles Turning Off Car-Tracks, of which the following is a specification, reference being had therein to the accompanying drawings.

This invention relates to a device for elevating the rear wheel of a wagon and permitting the same to turn readily off the car-track; and it has for its object to provide a simple means whereby this may readily be accomplished by the driver without moving from his accustomed seat on the wagon.

The principal features of the invention consist of a spring-arm which carries a block adapted to engage upon the flange of the car-rail, said spring-arm being fulcrumed in a clip which is attached to the axle of the wagon. At its fulcrum-point this spring-arm is provided with an upwardly-extending lever, to which is attached an operating-rod pivotally connected at its front end to the operating-lever, which is stationed near the front end of the wagon at a convenient point for the driver. As this latter lever is operated it throws the spring arm or bar downwardly, so as to bring the lifting-block into engagement with the tread of the rail directly in front of the rear wheel of the wagon, where it is engaged by the wheel and elevates the latter above the tread portion of the rail, at which time, owing to the inclined face of the lifting-block, the wheel will readily slide off the same onto the said part of the rail. All of these features and construction will be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1 is a side elevation of a wagon, showing our improved lifting device secured in position. Fig. 2 is a rear view of a portion of the wheel and wagon, showing the device attached in position. Fig. 3 is a like view of the same, showing the wheel in engagement with the block. Fig. 4 is a plan view of the guide-rack. Fig. 5 is a perspective view of the clip to which the lifting device is fulcrumed. Fig. 6 is a perspective view of the block.

To put our invention into practice, we provide a clip, which is preferably formed with four or more bolts $a$, which engage the upper and underneath faces of the axle $b$ and are secured thereto by a fastening-plate $c$, which is retained in position by the aid of nuts which engage the screw-threaded ends of the said bolts. The plate of the clip with which these bolts are formed integral is also provided with outwardly-extending lugs $d$, forming jaws, within which is journaled, by means of the pivot-pin $e$, the bearing for the spring arm or bar $f$. This latter is constructed with sufficient curve so that when the lifting-bock is engaged by the wheel the spring-arm will lengthen as it is straightened by the action of the wheel. On the lower end of this spring-arm is secured the lifting-block $g$, which may be provided with an extending lug $h$, having a recess $h'$ on its upper face, which is extended to the size of the spring arm or bar, within which the same is rigidly secured by riveting to the lug $h$ or other suitable means. This lifting-block is provided with a concave underneath face $g'$, thereby forming the gripping edges $g^2$ on the underneath face of the block and permitting the block to obtain a greater purchase upon the tread of the rail. This block is also provided with an inclined upper face $k$ and at one edge with an incline $k'$, the latter being for the purpose of permitting the wheel when it comes into engagement with the block being nearer the center thereof, so as to obviate the tilting of the block by its engagement with the wheel, and the former of which serves to cause the wheel to slide off the same after it has been elevated to a point equal to or above the height of the rail-tread. At the fulcrum-point of this spring arm or bar there is formed integral therewith an upwardly-extending lever $l$, which engages and operates within a rack $m$, which is secured by clips $n$, formed integral therewith, to the standard $o$ of the wagon. Attached to this lever $l$ is a horizontally-extending rod $p$, which is connected at its forward end to the operating-lever $q$, which is or may be fulcrumed to the front standard of the wagon or arranged at any other suitable point that may be desirable for the convenience of the driver. We will assume for the purpose of illustration that the driver forces this operating-lever $q$ backward, thereby causing the rod $p$ to pull the lever $l$ forward, which forces the spring arm or bar downward and brings the lifting-block $g$ into engagement with the flange of the rail directly in front of the wheel, where it is engaged by the said wheel, which rides upward on the block until it is elevated above the tread of the rail, when by reason of the inclined upper face of the block it will slide off the same and out of engagement therewith, at which time the operating-lever $q$ may be moved from the position shown in dotted lines to the position indicated in full lines, (see Fig. 1,) thereby returning the spring-arm $f$ and lifting-block $g$ to their normal position in front of the wheel. The necessary lengthening of the arm which carries this block, that is caused by the wheel passing over the same, is provided for by constructing the arm of sufficient curvature to allow for its lengthening.

While the foregoing appears to embody the preferable form of our invention, yet we do not wish to limit ourselves to the exact construction as herein shown and described, as various changes may be made in the details of construction without departing from the general spirit of our invention.

Having fully described our invention, what we claim as new, and desire to secure by Letters Patent, is—

1. In combination with a wagon or like vehicle, a curved spring arm or bar, a lifting-block attached to the lower end of same, fastening means attached to the axle of the wagon or other vehicle, and means for operating the aforesaid curved spring arm or bar, so as to bring the lifting-block into engagement with the rail directly in front of the wheel, as and for the purpose set forth.

2. In a device of the character described, a curved spring-arm carrying a lifting-block, a lever formed integral with said arm, means for supporting the same from the axle of a suitable vehicle, and means for operating the arm so as to move the block into position to be engaged by the wheel and lift the same as it passes over the block, as and for the purpose described.

3. In a device of the character described, the combination of the spring-arm and a lever formed integral with each other, a clip secured to the axle and within which the same are pivotally secured, the lifting-block carried by the spring-arm, the operating-lever and rod, and the guide within which the lever formed with the spring-arm operates, substantially as shown and described.

4. In a device of the character described, a clip secured to the axle, a spring-arm and lever pivotally secured in said clip, a lifting-block carried by said spring-arm, said lifting-block having an inclined upper face, substantially as shown and described.

5. In a device of the character described, the combination of the spring-arm, a lifting-block arranged to the lower end of the same, the other end of said spring secured to the lugs of a clip, said clip being attached to the axle of the vehicle, a lever, rod and operating-lever, substantially as described.

In testimony whereof we affix our signatures in the presence of two witnesses.

GEORGE B. FRITZIUS.
WESLY N. MARKS.

Witnesses:
JOHN NOLAND,
GEO. B. PARKER.